United States Patent
Takizawa et al.

(10) Patent No.: US 6,174,354 B1
(45) Date of Patent: *Jan. 16, 2001

(54) INK, INK-JET RECORDING PROCESS AND APPARATUS USING THE SAME

(75) Inventors: Yoshihisa Takizawa, Machida; Yoshifumi Hattori, Yamato; Mayumi Yamamoto, Tokyo; Mikio Sanada, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/626,312

(22) Filed: Apr. 2, 1996

(30) Foreign Application Priority Data

Apr. 7, 1995 (JP) .................................................. 7-107082
Jan. 4, 1996 (JP) .................................................. 8-14765

(51) Int. Cl.[7] .............................. C09D 11/10; C08K 5/16
(52) U.S. Cl. ................................. 106/31.43; 106/31.75; 523/161; 524/236; 524/238; 524/239
(58) Field of Search ................................. 106/20 R, 22 R, 106/22 H, 31.6, 31.75, 31.43; 523/160, 161; 524/236, 238, 239

(56) References Cited

U.S. PATENT DOCUMENTS

| 4,904,719 | * | 2/1990 | Michel | 524/238 |
|---|---|---|---|---|
| 4,909,986 | * | 3/1990 | Kobayashi et al. | 422/4 |
| 5,106,416 | | 4/1992 | Moffatt et al. | 106/20 |
| 5,130,198 | * | 7/1992 | Swisher et al. | 524/239 |
| 5,226,957 | | 7/1993 | Wickramanayake et al. | 106/25 R |
| 5,240,982 | * | 8/1993 | Farwaha et al. | 524/236 |
| 5,288,687 | * | 2/1994 | Murakami et al. | 503/214 |
| 5,482,545 | | 1/1996 | Aoki et al. | 106/22 K |
| 5,529,616 | * | 6/1996 | Prasad | 106/20 R |
| 5,648,405 | * | 7/1997 | Ma et al. | 523/161 |

FOREIGN PATENT DOCUMENTS

| 0556649 A1 | | 8/1993 | (EP) . |
|---|---|---|---|
| 0556650 A1 | | 8/1993 | (EP) . |
| 61-59911 | | 5/1979 | (JP) . |
| 61-59912 | | 5/1979 | (JP) . |
| 61-59914 | | 2/1980 | (JP) . |
| 55-65269 | | 5/1980 | (JP) . |
| 55-66976 | | 5/1980 | (JP) . |
| 60-96673 | | 5/1985 | (JP) . |
| 3145381 | * | 6/1988 | (JP) . |
| 3145382 | * | 6/1988 | (JP) . |
| 4-139272 | | 5/1992 | (JP) . |

* cited by examiner

*Primary Examiner*—Tae Yoon
(74) *Attorney, Agent, or Firm*—Fitzpatrick, Cella, Harper & Scinto

(57) ABSTRACT

The invention provides an ink comprising a coloring material, a solvent for dissolving or dispersing the coloring material, and an amphoteric polymer having both anionic and cationic groups. The invention also provides an ink-jet recording process and apparatus using such an ink.

18 Claims, 6 Drawing Sheets

INK, INK-JET RECORDING PROCESS AND APPARATUS USING THE SAME

BACKGROUND OF THE INVENTION

1. Field of the Invention

The present invention relates to a technique for obtaining a waterproof ink image with decreased color-bleeding when a color image is formed on plain paper. In particular, it relates to an ink useful in image formation by means of an ink-jet recording process and apparatus using the ink.

2. Related Background Art

Ink-jet recording methods include recording by adhering ejected ink or inks to a recording medium such as paper. According to Japanese Patent Publication Nos. 61-59911, 61-59912, and 61-59914, a recording head having high density multi-orifices can be easily used in an ink-jet recording method in which liquid drops are discharged by forming bubbles in the ink by means of thermal energy from an electro-thermal transducer as the discharge energy supplying means. Moreover, an image having high resolution and high quality can be recorded at high speed.

However, conventional inks used for ink-jet recording generally include water as the major component and contain water-soluble solvents having a high boiling point, such as glycol, in order to prevent drying and clogging. Therefore, when recording on plain paper as the recording medium with such inks, the following problem occurs: The image cannot be satisfactorily fixed, and is not formed homogeneously, possibly due to non-homogeneous distribution of fillers and sizing agents on the recording medium surface. In particular, when forming color images, different color inks are continuously overlapped before each color ink is completely fixed on the paper. Thus, at the boundary section of different colors in the image, non-homogeneous color mixing (called "bleeding" below) is observed. Moreover, satisfactory water-proof printing has been increasingly demanded recently.

As a means for solving the above problems, the addition of a compound which improves permeability, such as a surfactant, to the inks is disclosed in Japanese Patent Laid-Open No. 55-65269. Further, an ink mainly containing volatile solvents is disclosed in Japanese Patent Laid-Open No. 55-66976. U.S. Pat. No. 5,106,416 discloses an ink containing a cation dyestuff, an ampholytic surfactant, and a nonionic amphiphilic compound. Moreover, U.S. Pat. No. 5,226,957 discloses an ink containing a water-insoluble dyestuff, a polymeric colloidal compound, and a surfactant. In addition, inks using betaine types of acrylic resins are disclosed in Japanese Patent Laid-Open Nos. 60-96673 and 4-139272.

When using the ink containing a compound, such as a surfactant, which improves the permeability of the ink into the recording paper, as described in the aforementioned Japanese Patent Laid-Open No. 55-65269, although fixing performance and bleeding resistance can be improved to some extent due to enhanced permeability of the ink into the recording paper, the ink permeates deep into the inside of the paper together with the coloring material. Therefore, there are some problems, such as decreased image density. Also decreased resolution and bleeding are observed at the same time, due to the horizontal spreading of the ink.

In the aforementioned Japanese Patent Laid-Open No. 55-66976, the nozzle in the recording head easily clogs due to the evaporation of the solvent, in addition to the above problems.

Although U.S. Pat. No. 5,106,416 intends to provide an ink containing a cation dyestuff, an ampholytic surfactant, and a nonionic amphiphilic compound, in which the diffusion of the coloring material is suppressed by the addition of the ampholytic surfactant in an amount that is at least equal to the critical micelle concentration or more, images obtained from this ink are not entirely satisfactory due to the enhanced permeability of the ink itself caused by the surfactant, similar to the aforementioned Japanese Patent Laid-Open No. 55-65269. In the ink containing a water-insoluble dyestuff, a polymeric colloidal compound, and a surfactant, disclosed in U.S. Pat. No. 5,226,957, the same disadvantages as well as the problems mentioned in U.S. Pat. No. 5,106,416 exist: Clogging in the head and nozzle occurs due to the precipitation of the water-insoluble dyestuff or coagulation of the colloidal compound.

Moreover, although the betaine types of acrylic resins are used to prevent bleeding of the oil-soluble ink in Japanese Patent Laid-Open No. 60-96673, or to improve the stability of the pigment ink in Japanese Patent Laid-Open No. 4-139272, high quality images cannot be achieved on plain paper.

SUMMARY OF THE INVENTION

The present invention intends to solve the aforementioned problems, and in particular, to provide an ink for forming uniform, high quality images with decreased bleeding and good image density, when the recording, especially color recording, is done on plain paper, and to provide an ink-jet recording process and apparatus using such ink.

The present invention further intends to provide an ink for forming high quality images having excellent water-proof properties, and to provide an ink-jet recording process and apparatus using such ink.

The above-mentioned objects can be accomplished by the following embodiments of the present invention.

The first embodiment includes an ink comprising a coloring material, a solvent for dissolving or dispersing the coloring material, and an ampholytic polymer having both anionic groups and cationic groups.

The second embodiment includes an ink comprising a coloring material, a solvent for dissolving or dispersing the coloring material, an ampholytic polymer having both anionic groups and cationic groups, and a compound represented by the following general formula (A):

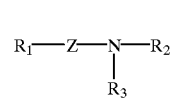

(A)

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from the group consisting of a carboxyl group, salts of the carboxyl group, a sulfonic group, salts of the sulfonic group, and a hydrogen atom; and when each of $R_2$ and $R_3$ is a hydrogen atom, it is not that c and e are zero at the same time, and it is not that all of $X_1$, $X_2$, $X_3$, and $X_4$ are hydrogen atoms.

The third embodiment of the present invention includes an ink-jet recording process comprising adhering an ink on the recording medium as drops by means of an ink-jet system, wherein the ink is the ink of the first or second embodiment.

The fourth embodiment includes an ink-jet recording apparatus comprising an ink reservoir and an ink-jet head for forming ink drops from the ink supplied from the ink reservoir, wherein the ink is the ink of the first or second embodiment.

Another embodiment of the present invention includes an ink-jet recording unit comprising an ink reservoir and a head for discharging the ink as drops, wherein the ink is the ink of the first or second embodiment.

A further embodiment of the present invention includes an ink cartridge comprising an ink reservoir, wherein the ink is the ink of the first or second embodiment.

Still another embodiment of the present invention includes an ink-jet recording apparatus having an ink-jet recording unit comprising an ink reservoir and a head for discharging the ink as drops, wherein the ink is the ink of the first or second embodiment.

A still further embodiment of the present invention includes an ink-jet recording unit comprising a recording head for discharging ink drops, an ink cartridge having an ink reservoir, and an ink supplying section for supplying the ink from the ink cartridge to the recording head, wherein the ink is the ink of the first or second embodiment.

DETAILED DESCRIPTION OF THE PREFERRED EMBODIMENTS

Figure 1:
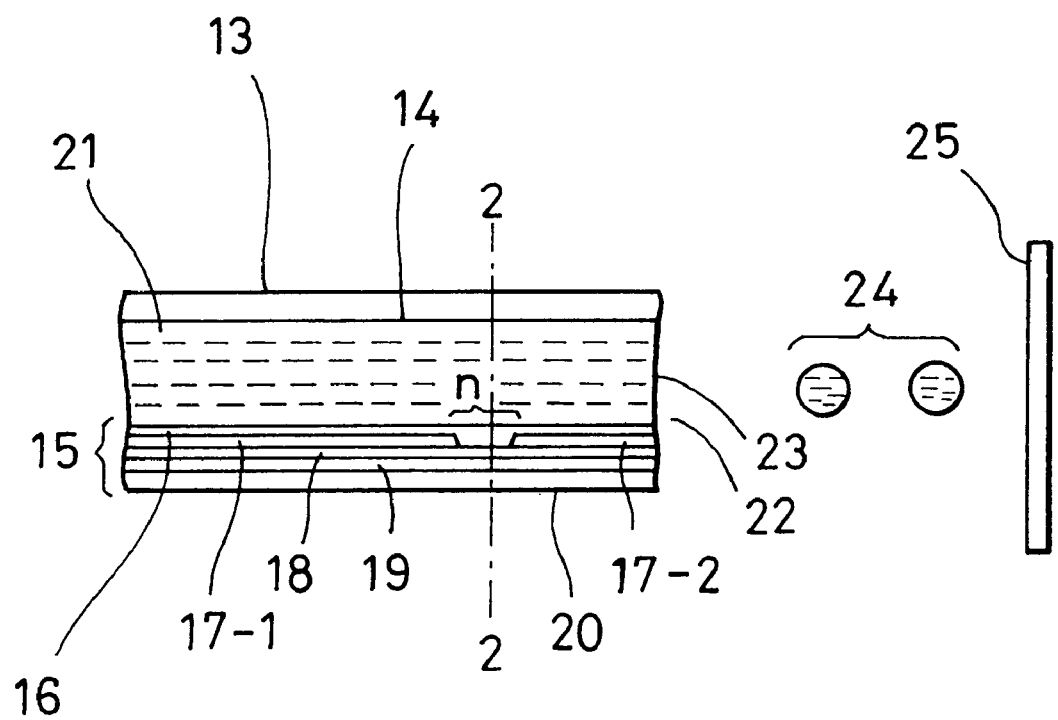
FIG. 1 is a longitudinal sectional view of a head section of an ink-jet recording apparatus.

Recording images satisfying the above-mentioned objects can be obtained by including an ampholytic polymer having both cationic groups and anionic groups in an ink having a coloring material and a solvent for dissolving or dispersing the coloring material.

When adding the ampholytic polymer having both cationic groups and anionic groups to the ink, the ink becomes a polymeric ampholytic electrolyte, which changes to a polymeric electrolyte showing anionic characteristics or cationic characteristics depending on its pH. When using an anionic dyestuff as the coloring material, both the dyestuff and the ampholytic polymer stably exist by means of the repulsion between the two molecules when the pH is higher than the isoelectric point of the ampholytic polymer. This is because the ampholytic polymer behaves as a polymeric electrolyte having anionic characteristics in the ink. After the ink is ejected from the recording head and attaches to plain paper, the pH of the ink changes to a value in the neutral region. The isoelectric points of the ampholytic polymers generally range in the neutral region, although, depending on their structure, the ampholytic polymers show both anionic and cationic characteristics and an electrically balanced state at the neutral region. In such a state, anionic and cationic groups in the ampholytic polymer form intramolecular salts, resulting in a rapid viscosity increase or thickening and gelation. Further, a cationic group in the ampholytic polymer and the anionic group in the dyestuff forms a salt, and the coloring material is fixed in the polymer. Since the coloring material in the ink is fixed together with the polymeric compound near the surface of the recording paper due to the fixation of the dyestuff in the polymer, and thickening and gelation of the ampholytic polymer, the image density is satisfactorily high and homogeneous, and bleeding of color images can be prevented. Thus, high quality images can be obtained. Moreover, since the coloring material is fixed within the polymer forming the intramolecular salt and since the solubility of the ampholytic polymer itself in water is decreased by the intramolecular salt formation, the water-proof properties will also be improved.

It has also been found that when a compound represented by the above general formula (A) is present in the ink viscosity increase and gelation due to the pH change are significantly promoted after the ink contacts plain paper. Although the reasons are not clear, it is presumed that they are promoted due to the catalytic effect of the compound of general formula (A) on the salt causing reaction between the coloring material and the ampholytic polymer and the intramolecular salt causing reaction of the ampholytic polymer.

The embodiment using an anionic dyestuff has been described above. When using a cationic dyestuff, similar effects can be accomplished by adjusting the pH of the ink to a value lower than the isoelectric point of the ampholytic polymer. Further, when using a pigment as a coloring material, similar effects will be accomplished by adjusting the pH of the ink in response to the surface charge of the pigment dispersion as follows: When the pigment is dispersed with an anionic resin, anionic surfactant or the like, the pH of the ink is set to a higher value than the isoelectric point of the ampholytic polymer. On the other hand, when the pigment is dispersed with a cationic resin, cationic surfactant or the like, the pH of the ink is set to a lower value than the isoelectric point of the ampholytic polymer.

The present invention will now be explained in more detail with preferred embodiments.

The ink used in the present invention contains an ampholytic polymer. Examples of the preferred ampholytic polymers include copolymers obtained by copolymerizing a monomer having an anionic group, such as carboxyl group and sulfonic group, with a monomer having a cationic group, such as amino group, imino group, pyrrolidone ring, and imidazole ring. Any random, alternate, block, or graft copolymers may be preferably used.

Examples of preferred monomers having an anionic group include unsaturated monomers having at least one carboxyl or sulfonic group, such as acrylic acid, itaconic acid, methacrylic acid, maleic acid, fumaric acid, and styrenesulfonic acid.

Examples of preferred monomers having a cationic group may include unsaturated monomers having at least a cationic group, such as 2-vinylpyrrolidone, 4-vinylpyrrolidone, n-methylaminoethyl methacrylate, allylamine, and diallylamine.

Examples of preferred ampholytic polymers include copolymers of allylamine/maleic acid, n-methylallylamine/maleic acid, 4-vinylpyridine/acrylic acid, n-methylaminoethyl methacrylate/methacrylic acid, acrylamide/styrenesulfonic acid, allylamine/styrenesulfonic acid, 2-vinylpyridine/maleic acid, diallylamine/styrene sulfonic acid, 4-vinylpyridine/maleic acid, 2-vinylpyridine/itaconic acid, n-methylaminoethyl methacrylate/acrylic acid, 4-vinylpyridine/itaconic acid, n-methyl allylamine/itaconic acid and 4-vinylpyridine/fumaric acid. Proteins having ampholytic characteristics can also be used.

Although the ampholytic polymers can be used without limitation on their physical properties, the preferred weight-average molecular weight of the polymer ranges from 1,000 to 1,000,000. A polymer of molecular weight less than 1,000 does not cause sufficient thickening and gelation even when the pH is changed, whereas a polymer of molecular weight exceeding 1,000,000 increases the initial viscosity of the ink, resulting in poor discharge characteristics.

The isoelectric point of the ampholytic polymer can be adjusted as needed by varying the ratio of the monomer having an anionic group to the monomer having a cationic group. The isoelectric point ranges from a pH of 3 to 10, and preferably 5 to 10.

An example for determining the isoelectric point of the ampholytic polymer will now be explained. The solubility of the ampholytic polymer reaches its minimum at the isoelectric point. Thus, approximately 1 to 20 weight % of the ampholytic polymer is previously dissolved in water, and the solution is adjusted to a pH greater than 10 with ammonia or the like. Then the pH is decreased by gradually adding acetic acid or the like. The pH at which maximum milky turbidity or precipitation appears, is taken as the isoelectric point. Instead of this, another procedure is also available in which the pH is raised gradually. Both procedures will give almost the same value. If the two results are different from each other, the average is taken as the isoelectric point.

The content of the ampholytic polymer in the ink desirably ranges from 0.1 to 30 percent by weight. A content of less than 0.1 percent by weight does not cause the expected effects on thickening and gelation, whereas a content exceeding 30 percent by weight increases the initial viscosity of the ink to an unsatisfactory extent. The preferred content ranges from 0.2 to 10 percent by weight, and most preferably from 0.3 to 8 percent by weight.

Regarding stability of the ink performance, each of $X_1$, $X_2$, $X_3$, and $X_4$ in the compound having general formula (A) is preferably selected from salts of carboxyl group, salts of sulfonic group, and hydrogen atom. When each of $X_1$, $X_2$, $X_3$, and $X_4$ is selected from a carboxyl group and sulfonic group, the compound having general formula (A) forms a cyclic structure, which readily results in decreased performance and reliability of the ink.

Further, in the compound having general formula (A), it is preferred for the stability of the ink's performance that each of $R_1$ and $R_4$ is an alkyl group having 1 to 32 carbon atoms, and each of c+d and e+f is an integer of 0 to 16, and each of a, b, g, and h is an integer of 1 or 2.

Preferred examples of the compound having general formula (A) are described for explanation and not for limitation as follows: These compounds may be used alone or in combination.

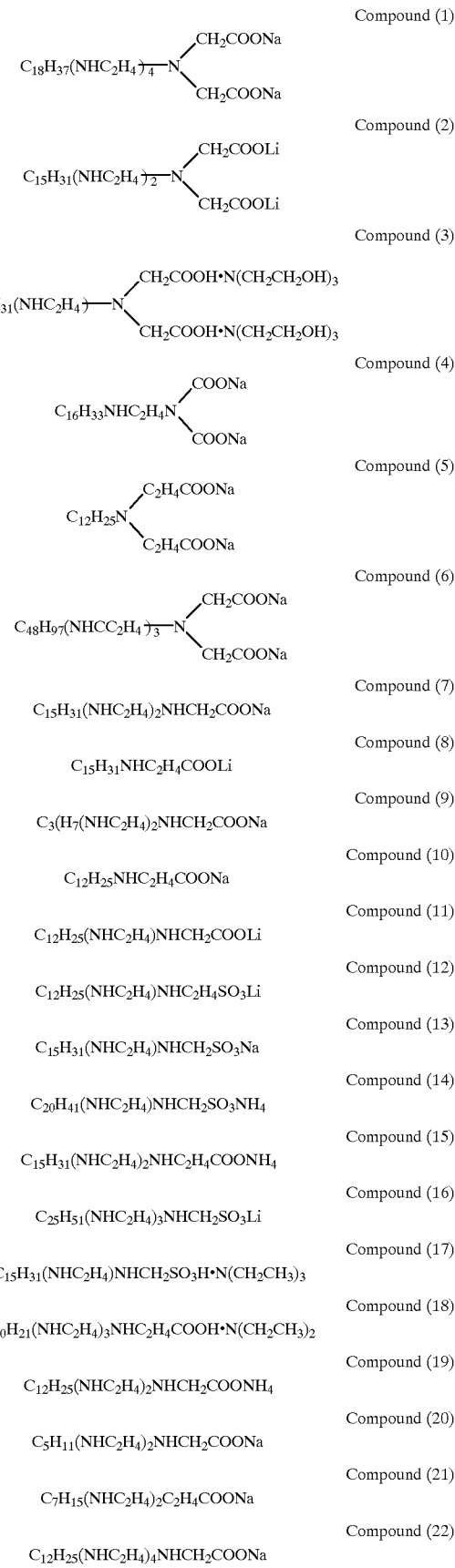

-continued

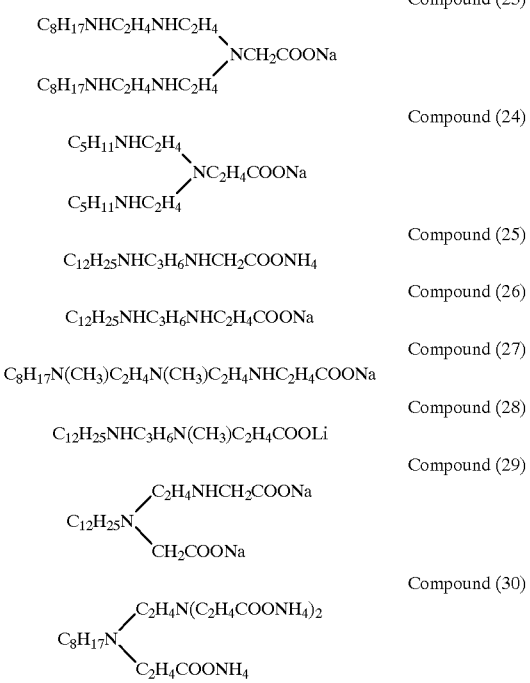

The content of the compound having general formula (A) in the ink is desirably 0.01 to 20 weight percent, and preferably 0.1 to 10.0 weight percent, although it considerably depends on the usage, object, coloring material, and ink composition. A content of less than 0.01 weight percent barely provides the desired effects, while a content over 10 weight percent causes an undesirable increase in the ink viscosity.

As the coloring material used for the ink, any conventional dyestuffs and pigments can be employed. Examples of the dyestuffs include acidic dyestuffs, basic dyestuffs, direct dyestuffs, and any other dyestuffs. Although the content of the coloring material is not limited, it preferably ranges from 0.1 to 20 percent by weight of the total weight of the ink.

The solvent for dissolving or dispersing the coloring material and ampholytic polymer generally comprises water and an optional water-soluble organic solvent. Examples of the water-soluble organic solvent used in the present invention include amide compounds such as dimethylformamide and dimethylacetamide; ketone compounds such as acetone; ether compounds such as tetrahydrofuran and dioxane; poly (alkylene glycol) compounds such as polyethylene glycol and polypropylene glycol; alkylene glycol compounds such as ethylene glycol, propylene glycol, butylene glycol, triethylene glycol, 1,2,6-hexanetriol, thiodiethylene glycol, hexylene glycol, and diethylene glycol; lower alkyl ether compounds of polyhydric alcohols such as glycerine, ethylene glycol monomethyl (or monoethyl) ether, diethylene glycol monomethyl (or monoethyl) ether, and triethylene glycol monomethyl (or monoethyl) ether; monohydric alcohol compounds such as ethanol, and isopropyl alcohol; and cyclic amide compounds such as N-methyl-2-pyrrolidone, 1,3-dimethyl-imidazolidinone, triethanolamine, sulfolane, dimethyl sulfoxide, 2-pyrrolidone, ε-caprolactam, and imide compounds, such as succinimido.

The content of the water-soluble organic solvent preferably ranges from 1 to 80 percent by weight, and more preferably from 3 to 50 percent by weight.

Any pH modifier including alkaline, such as ammonia water, sodium hydroxide, and potassium hydroxide, and acids, such as acetic acid, carbonic acid, and hydrochloric acid, may be used as needed in order to adjust the ink to a predetermined pH.

Other additives such as surfactants, antiseptics, rust preventives, antioxidants, vaporization promoters, chelating agents, and water-soluble polymers can be added to the ink of the present invention if necessary.

A process for preparing the ink of the present invention will be explained. Before adding a dyestuff, the ionic characteristics of the ampholytic polymer used must be adjusted by varying the pH in response to the ionic characteristics of the dyestuff used. For example, when using an anionic dyestuff, the ampholytic polymer is converted to an anionic polymer electrolytic solution by adjusting the pH to a value higher than its isoelectric point in the aqueous solution used. Then the anionic dyestuff is added to prepare the ink. On the other hand, when using a cationic dyestuff, a cationic polymer electrolytic solution is prepared by adjusting the pH of the aqueous solution of the ampholytic polymer to a value lower than its isoelectric point.

The compound having general formula (A) can be used in a way similar to the above ampholytic polymer in the present invention, in which the pH of the solution is previously adjusted in response to the ionic property of the coloring material used. For example, when using an anionic dyestuff, an aqueous solution in which the compound (A) is dissolved at an alkaline region, is preferably used, whereas when using a cationic dyestuff, an aqueous solution dissolved at an acidic region is preferably used.

When using a pigment as the coloring material, the pigment dispersion is previously prepared. Dispersants used may be, for example, anionic polymers, cationic polymers, anionic surfactants, and cationic surfactants. Dispersion of the pigment can also be carried out by any dispersing machine, for example, a sand grinder. In this case, the ionic characteristics of the ampholytic polymer must also be previously adjusted with respect to pH, in response to the ionic characteristics of the dispersion resin being used. For example, when an anionic polymer, such as styrene/acrylic acid copolymer, is used as the dispersant to prepare the pigment dispersion, the ampholytic polymer must be converted to the respective anionic polymer electrolytic solution by adjusting the pH to a value higher than its isoelectric point, before the pigment dispersion is added. Then the ink of the present invention is prepared by adding the pigment dispersion to the polymer electrolytic solution.

Any conventional recording paper can be used in the present invention, and conventional plain paper can be preferably used.

In images formed by the present invention, bleeding is effectively prevented not only at the boundaries between different colors, but also where black dots are added to the background.

The recording apparatus used in the present invention will be explained. The preferred recording process and apparatus are ink-jet recording process and apparatus in which the liquid drop is jetted by thermal energy produced by a recording signal provided to the ink in the recording head.

Figure 2:
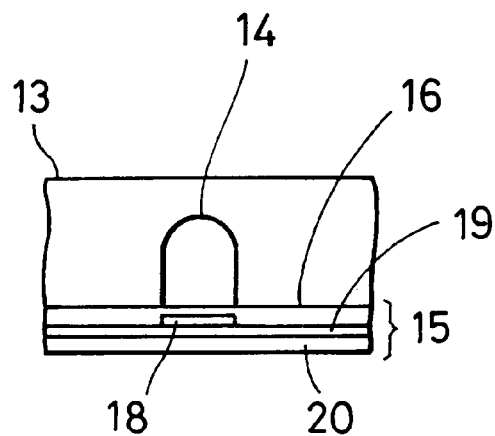
FIG. 2 is a cross-sectional view of the head section of the ink-jet recording apparatus.
Figure 3:
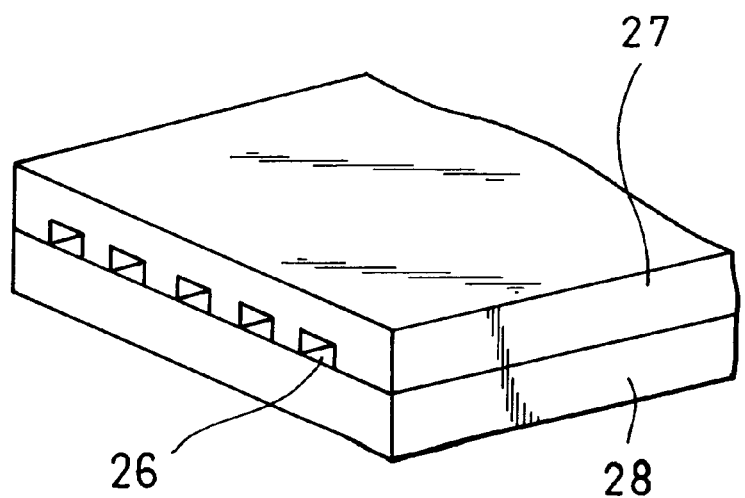
FIG. 3 is a perspective view of a multiple head comprising the head section shown in FIG. 1.

The structure of the recording head, the main component of the apparatus, is shown in FIGS. 1, 2 and 3.

The head 13 is produced by the adhesion of a plate having a groove 14 through which ink flows, made of glass, ceramic, or plastic, and a thermal head 15 including a heating resistance layer for thermal recording (in these figures, although a thin-film head is shown, it is for the purpose of description and not of limitation). The thermal head 15 comprises a protecting film 16 formed of silicon oxide and the like, aluminum electrodes 17-1 and 17-2, a heating resistance layer 18 made of nichrome, a heat accumulating layer 19, and a radiating substrate 20 such as an alumina substrate.

The ink 21 reaches a discharge orifice 22 and forms a meniscus 23 due to pressure. When applying an electric signal to electrodes 17-1 and 17-2, the region n in the thermal head 15 is rapidly heated, and a bubble forms in the ink in contact with the thermal head 15. The meniscus 23 protrudes due to the pressure from bubble formation. Then, the ink drop 24 formed at the discharge orifice 22 is ejected toward the recording medium 25.

FIG. 3 is a perspective view of a recording head in which a number of nozzles as shown in FIG. 1 are arranged. This recording head is made by adhering a plate 27 such as a glass, plate having a number of passages 26 to a thermal head 28 similar to that described in FIG. 1. While FIG. 1 is a cross-sectional view of the head 13 along the ink passage, FIG. 2 is a cross-sectional view at the line 2—2 of FIG. 1.

Figure 4:
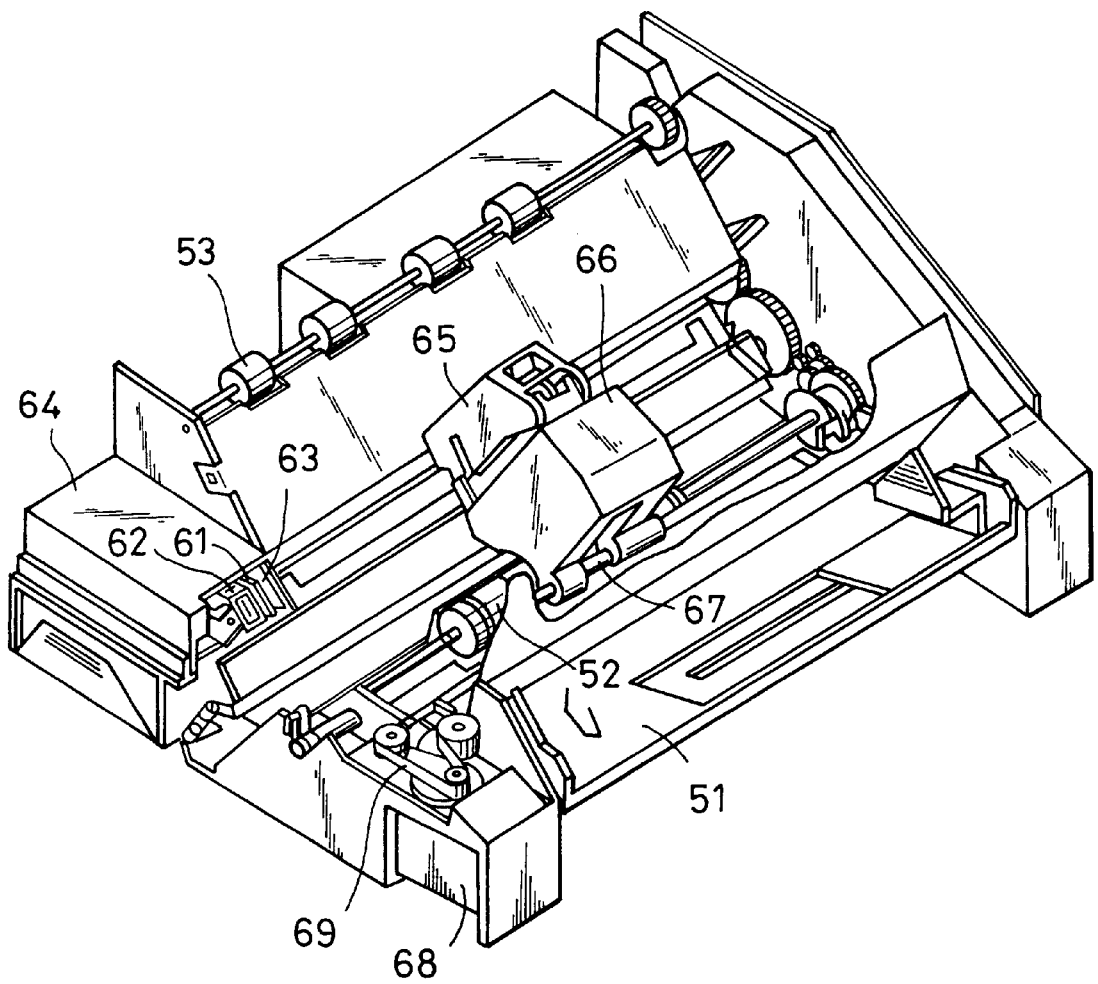
FIG. 4 is a perspective view exemplifying an ink-jet recording apparatus.

FIG. 4 is an example of an ink-jet recording apparatus incorporating the above-described head. In FIG. 4, an end of a blade 61, acting as a wiper, is held by a blade holding member to form a fixed end formed as a cantilever. The blade 61 is provided at a position adjacent a region being recorded by the recording head 65. In this embodiment, the blade 61 is held so as to protrude into the path of movement of the recording head 65. A cap 62 for the ink-ejection opening of the recording head 65 is placed at the home position adjacent the blade 61. The cap 62 moves in the direction perpendicular to the direction of movement of the recording head 65, and can contact the ink-ejection opening to cap it. An ink absorbent 63 is provided adjacent the blade 61, and protrudes into the path of movement of the recording head 65, like the blade 61. An ink-jet recovery section 64 consists of the blade 61, the cap 62, and the ink absorbent 63. The blade 61 and the ink absorbent 63 remove water, dust and the like from the ink-ejection opening.

The recording head 65 has an energy-generating means and records images on the recording medium opposite the ink-ejection opening having a nozzle, by ejecting the ink. A carriage 66 is provided to carry the recording head 65 mounted on the carriage 66. The carriage 66 is attached so as to slide along a guide shaft 67, and a part of the carriage 66 connects with a belt 69 driven by a motor 68 (the connection is not shown in FIG. 4). Since the carriage 66 can move along the guide shaft 67, the recording head 65 can also move to the recording regions and their surrounding regions.

The recording medium is fed to a position opposite the ink-ejection opening of the recording head 65 by a feeder 51 inserting the recording medium and a carrying roll 52 driven by a motor (not shown), and is discharged to a discharge section provided with a discharge roll 53 as recording proceeds.

When the recording head 65 returns to the home position due to completion of recording and the like, the cap 62 in the ink-jet recovery section 64 recedes from the path of movement of the recording head 65, but the blade 61 protrudes into the path of movement. As a result, the ink-ejection opening of the recording head 65 is wiped. When the cap 62 contacts the ink-ejection opening of the recording head 65 in order to cap the ink-ejection opening, the cap 62 moves so as to protrude into the path of movement of the recording head. When the recording head 65 moves from the home position to a position starting the recording, since the cap 62 and blade 61 are located at the same position as that at wiping, the ink-ejection opening of the recording head 65 is also wiped by this motion. The recording head 65 moves to the home position at the time of completion of recording and recovery of the ink-jet. Further, the recording head 65 moves to the home position for wiping at predetermined intervals when the recording head 65 moves between recording regions.

Figure 5:
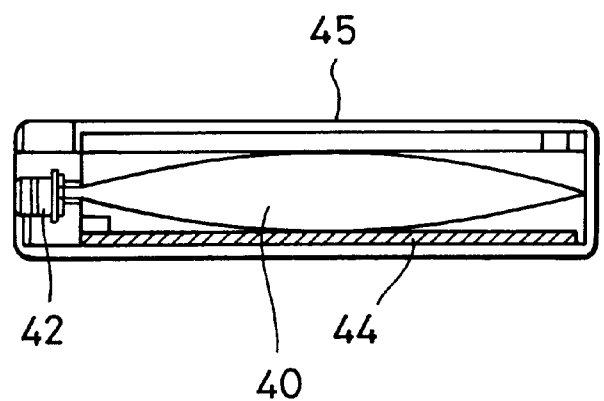
FIG. 5 is a vertical sectional view of an ink cartridge.

FIG. 5 is an embodiment of the ink cartridge 45 containing the ink to be fed to the head though an ink feeding member such as a tube. The ink is stored in an ink reservoir 40, for example, an ink bag, having a rubber stopper 42 at the opening end. The ink in the ink bag 40 can be fed to the head by inserting a needle (not shown in the figure) into the stopper 42. Waste ink is absorbed with an ink absorbent 44. Desirable materials for the surface which contacts the ink in the ink reservoir are polyolefin compounds, in particular, polyethylene.

Figure 6:
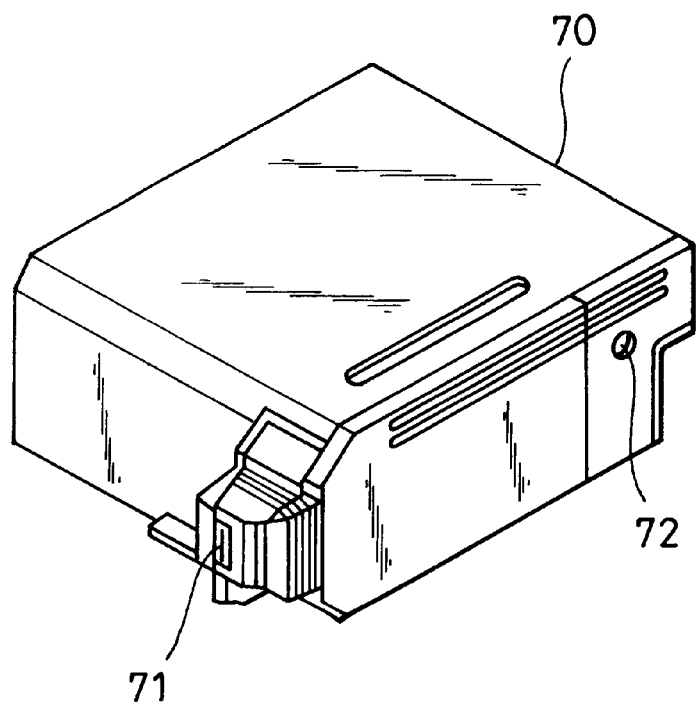
FIG. 6 is a perspective view of a recording unit.

As the ink-jet recording apparatus used in the present invention, an apparatus integrating the head and ink cartridge, as shown in FIG. 6, can be preferably used instead of the separate type of apparatus described above. In FIG. 6, a recording unit 70 contains the ink reservoir such as an ink absorbing member, and the ink in the ink absorbing member is discharged as an ink drop from a head 71 having plural orifices. As an example of the material composing the ink absorbing member, polyurethane, cellulose or polyvinyl acetate may be used. An opening 72 is provided to communicate air to the recording unit inside. The recording unit 70 is used instead of the recording head shown in FIG. 4 and is freely loaded to and unloaded from the carriage 66.

In the present invention, an ink-jet recording apparatus which discharges the ink drops by applying thermal energy to the ink has been described. However, other types of ink-jet recording apparatus, such as the piezoelectric type, can also be used.

Figure 7:
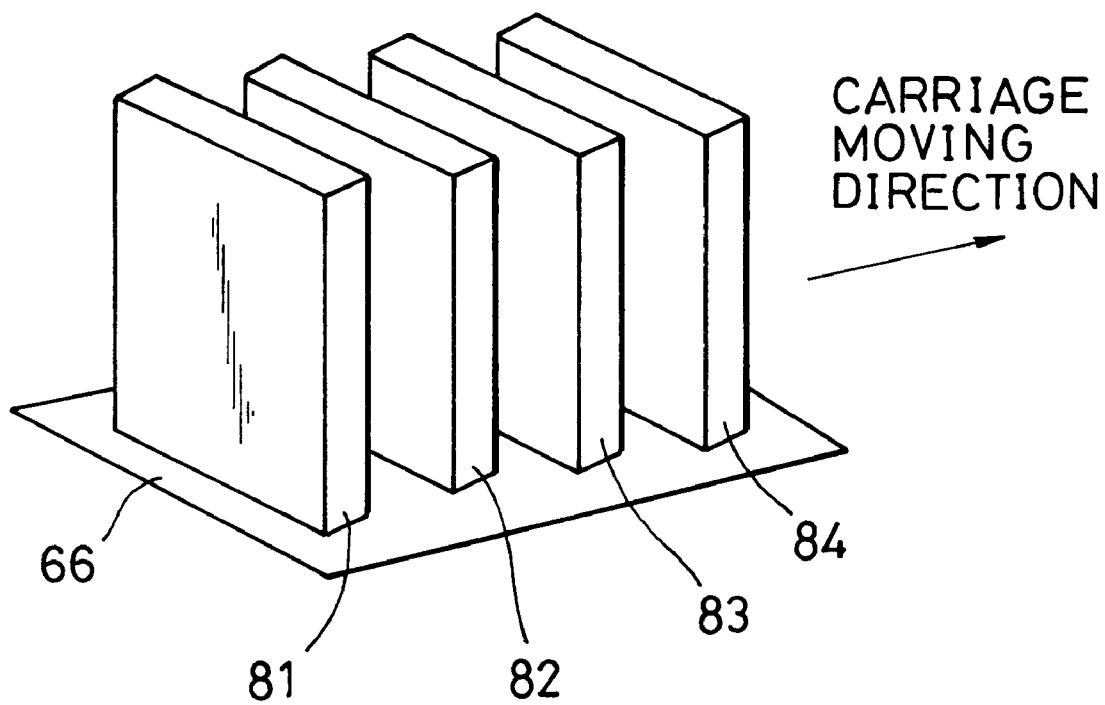
FIG. 7 is a perspective view illustrating a recording section in which plural recording heads, used in the present invention, are arranged.
Figure 8:
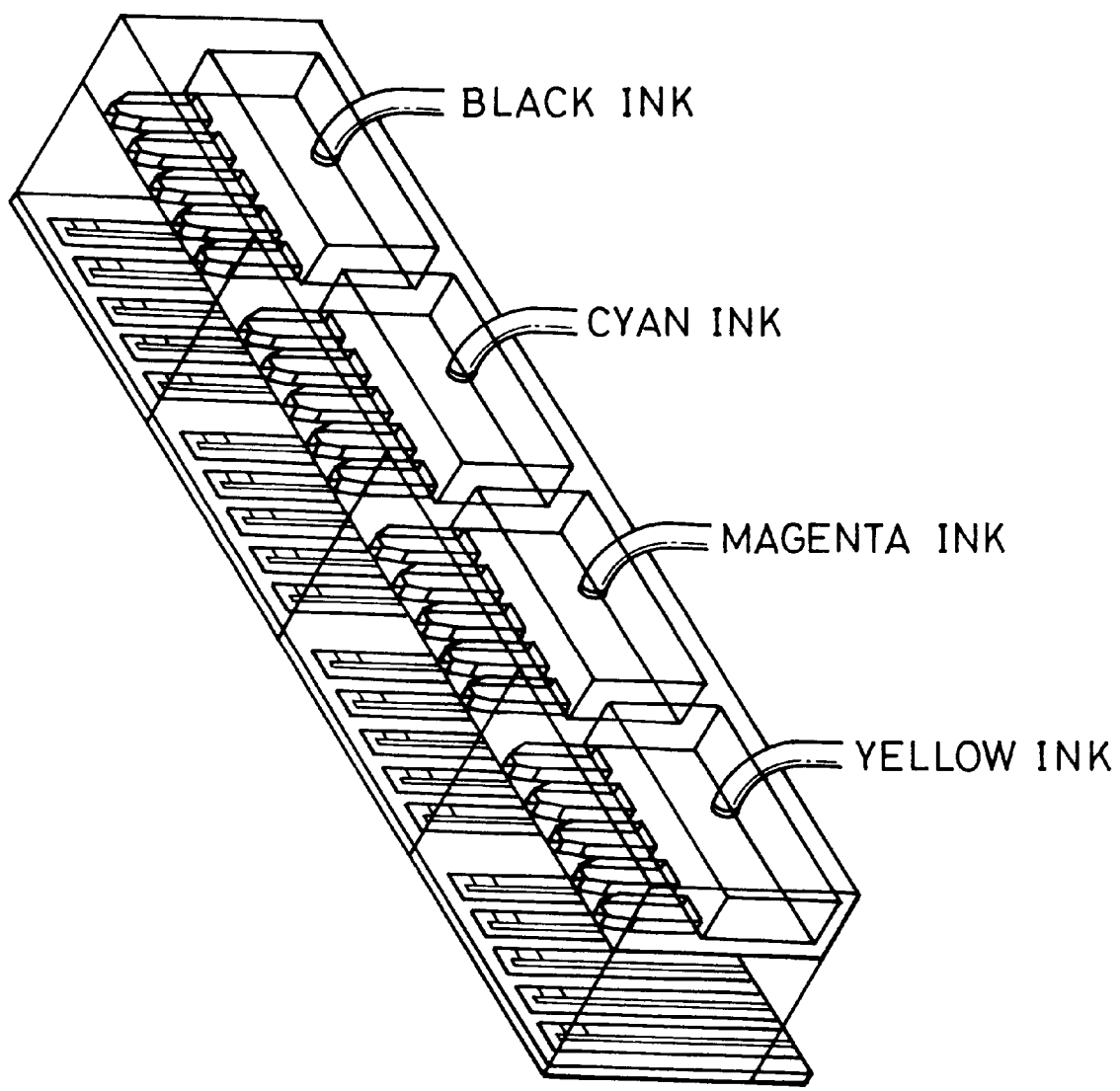
FIG. 8 is a perspective view of another recording head used in the present invention.

When performing the recording process of the present invention, a recording apparatus shown in FIG. 7 may be used, in which four recording heads shown in FIG. 3 are arranged on the carriage 66. These recording heads 81, 82, 83 and 84 discharge yellow, magenta, cyan, and black inks, respectively. These heads 81 to 84 are arranged in the recording apparatus and discharge the respective inks in response to recording signals. The number of recording heads is not restricted to the embodiment shown in FIG. 7, in which four heads are used. For example, the yellow ink, magenta ink, cyan ink, and-black ink may be discharged from the respective nozzles in a long recording head as shown in FIG. 8.

EXAMPLES

The present invention is explained in more detail by the following EXAMPLES. In these EXAMPLES, "pbw" means parts by weight and the formulations are based on one hundred parts; "weight %" means percent by weight.

Example 1

According to the formulation described below, an ampholytic polymer was dissolved into a mixture of a solvent and water, and the pH of the solution was adjusted to 9.5 with ammonia water. After completely dissolving the polymer, the dyestuff, i.e., C. I. Direct Yellow 86, or C. I. Food Black 2, was gradually added into the solution to dissolve while agitating the solution. The solution was filtered under pressure with a membrane filter having a pore size of 0.22 $\mu$m made by Sumitomo Electric Industries, Ltd., brand name: FLUOROPORE-FILTER, to obtain a recording ink.

The Composition of Yellow Ink

| | |
|---|---|
| 4-vinylpyridinelacrylic acid copolymer (Mw = 8,000) | 5 pbw |
| Diethylene glycol | 20 pbw |
| C. I. Direct Yellow 86 | 3 pbw |
| Water | 72 pbw |

The Composition of Black Ink

| | |
|---|---|
| 4-vinylpyridine/acrylic acid copolymer (Mw = 8,000) | 5 pbw |
| Diethylene glycol | 20 pbw |
| C. I. Food Black 2 | 3 pbw |
| Water | 72 pbw |

Example 2

According to the formulation described below, an ink was prepared in a manner similar to EXAMPLE 1, but the pH of the solution was adjusted to 9.5 with sodium hydroxide instead of ammonia water.

The Composition of Yellow Ink

| | |
|---|---|
| allylamine/styrenesulfonic acid copolymer (Mw = 80,000) | 2 pbw |
| Diethylene glycol | 10 pbw |
| Glycerin | 5 pbw |
| C. I. Direct Yellow 86 | 3 pbw |
| Water | 80 pbw |

The Composition of Magenta Ink

| | |
|---|---|
| 4-vinylpyridine/acrylic acid copolymer (Mw = 8,000) | 5 pbw |
| Thiodiglycol | 20 pbw |
| C. I. Acid Red 35 | 3 pbw |
| Water | 72 pbw |

The Composition of Cyan Ink

| | |
|---|---|
| 2-vinylpyridine/maleic acid copolymer (Mw = 20,000) | 5 pbw |
| Diethylene glycol | 20 pbw |
| C. I. Direct Blue 199 | 3 pbw |
| Water | 72 pbw |

The Composition of Black Ink

| | |
|---|---|
| 4-vinylpyridine/acrylic acid copolymer (Mw = 8,000) | 5 pbw |
| Diethylene glycol | 20 pbw |
| C. I. Food Black 2 | 3 pbw |
| Water | 72 pbw |

Example 3

According to the formulation described below, an ink was prepared in a manner similar to EXAMPLE 1, but the pH of the solution was adjusted to 9.5 with sodium hydroxide instead of ammonia water.

The Composition of Yellow Ink

| | |
|---|---|
| allylamine/styrenesulfonic acid copolymer (Mw = 2,000) | 10 pbw |
| Diethylene glycol | 30 pbw |
| Glycerin | 5 pbw |
| Urea | 5 pbw |
| C. I. Direct Yellow 142 | 3 pbw |
| Water | 47 pbw |

The Composition of Magenta Ink

| | |
|---|---|
| 4-vinylpyridine/maleic acid copolymer (Mw = 800,000) | 0.5 pbw |
| Thiodiglycol | 30 pbw |
| C. I. Direct Red 227 | 4 pbw |
| Water | 65.5 pbw |

The Composition of Cyan Ink

| | |
|---|---|
| 2-vinylpyridine/itaconic acid copolymer (Mw = 5,000) | 1 pbw |
| Diethylene glycol | 35 pbw |
| C. I. Acid Blue 9 | 3 pbw |
| Water | 61 pbw |

The Composition of Black Ink

| | |
|---|---|
| n-methylaminoethyl methacrylate/acrylic acid copolymer (Mw = 8,000) | 5 pbw |
| Diethylene glycol | 30 pbw |
| C. I. Food Black 2 | 3 pbw |
| Water | 62 pbw |

Example 4

According to the formulation described below, an ink was prepared in a manner similar to EXAMPLE 1, but the pH of the solution was adjusted to 5.5 with hydrochloric acid to dissolve the ampholytic polymer.

The Composition of Yellow Ink

| | |
|---|---|
| allylamine/styrenesulfonic acid copolymer (Mw = 80,000) | 2 pbw |
| Diethylene glycol | 10 pbw |
| Glycerin | 5 pbw |
| C. I. Basic Yellow 11 | 3 pbw |
| Water | 80 pbw |

The Composition of Magenta Ink

| | |
|---|---|
| 4-vinylpyridine/acrylic acid copolymer (Mw = 8,000) | 5 pbw |
| Thiodiglycol | 20 pbw |
| C. I. Basic Red 27 | 3 pbw |
| Water | 72 pbw |

The Composition of Cyan Ink

| 2-vinylpyridine/maleic acid copolymer (Mw = 20,000) | 5 pbw |
|---|---|
| Diethylene glycol | 20 pbw |
| C. I. Basic Blue 41 | 3 pbw |
| Water | 72 pbw |

Example 5

Preparation of Yellow Pigment Dispersion

| styreneacrylic acid/butyl acrylate copolymer (Acid value = 116, Mw = 3,700) | 2 pbw |
|---|---|
| Monoethanolamine | 2 pbw |
| Water | 76 pbw |
| Diethylene glycol | 5 pbw |

The above components were mixed and heated to 70° C. in a water bath to completely dissolve the resin component. Into the solution, 15 parts by weight of C. I. Pigment Yellow 12 was added. After preliminarily mixing for 30 minutes, the dispersion was further treated under the following conditions:

Dispersion mixer: Sand grinder made by Igarashi Kikai K. K.

Grinding media: Zirconia Beads (1 mm in diameter)

Filling ratio of grinding media: 50% by volume

Grinding time: 3 hours

After the treatment, the dispersion was subjected to centrifugal separation at 12,000 rpm for 20 minutes, to eliminate coarse particles.

In order to prepare a recording ink from the resulting pigment dispersion, all the components described below other than the pigment dispersion were mixed to dissolve the ampholytic polymer, and the pH of the solution was adjusted to 9.5 with ammonia water. After completely dissolving the ampholytic polymer, the pigment dispersion was gradually added to the solution to prepare the recording ink.

The Composition of Yellow Ink

| The above-mentioned pigment dispersion | 30 pbw |
|---|---|
| 4-vinylpyridine/itaconic acid copolymer (Mw = 10,000) | 2 pbw |
| Glycerin | 5 pbw |
| Diethylene glycol | 12 pbw |
| Isopropyl alcohol | 3 pbw |
| Water | 48 pbw |

Magenta, cyan, and black dispersions were also prepared by a similar process by using 15 parts by weight of C. I. Pigment Red 5, 15 parts by weight of C. I. Pigment Blue 15, and 15 parts by weight of carbon black, respectively, instead of C. I. Pigment Yellow 12. After the pH of each ampholytic polymer solution was adjusted to 9.5 with ammonia water, the respective pigment dispersion was added and mixed to obtain the respective recording ink.

The Composition of Magenta Ink

| The dispersion of C. I. Pigment Red 5 | 30 pbw |
|---|---|
| n-methylallylamine/itaconic acid copolymer (Mw = 7,000) | 5 pbw |
| Glycerin | 5 pbw |
| Diethylene glycol | 12 pbw |
| Isopropyl alcohol | 3 pbw |
| Water | 45 pbw |

The Composition of Cyan Ink

| The dispersion of C. I. Pigment Blue 15 | 30 pbw |
|---|---|
| 4-vinylpyridine/fumaric acid copolymer (Mw = 30,000) | 1 pbw |
| Glycerin | 5 pbw |
| Diethylene glycol | 12 pbw |
| Isopropyl alcohol | 3 pbw |
| Water | 49 pbw |

The Composition of Black Ink

| The dispersion of Carbon Black | 30 pbw |
|---|---|
| 4-vinylpyridine/itaconic acid copolymer (Mw = 10,000) | 2 pbw |
| Glycerin | 5 pbw |
| Diethylene glycol | 12 pbw |
| Isopropyl alcohol | 3 pbw |
| Water | 48 pbw |

Example 6

Preparation of Yellow Pigment Dispersion

| poly(N,N'-dimethyl-3,5-methylenepiperidinium) salt (Mw = 3,700) | 2 pbw |
|---|---|
| Water | 78 pbw |
| Diethylene glycol | 5 pbw |

The above components were mixed and heated to 70° C. in a water bath to completely dissolve the resin component. Into the solution, 15 parts by weight of C. I. Pigment Yellow 12 was added. After preliminarily mixing for 30 minutes, the dispersion was further treated under the following conditions:

Dispersion mixer: Sand grinder made by Igarashi Kikai K. K.

Grinding media: Zirconia Beads (1 mm in diameter)

Filling ratio of grinding media: 50% by volume

Grinding time: 3 hours

After the treatment, the dispersion was subjected to centrifugal separation at 12,000 rpm for 20 minutes, to eliminate coarse particles.

In order to prepare a recording ink from the resulting pigment dispersion, all the components described below other than the pigment dispersion were mixed to dissolve the ampholytic polymer, and the pH of the solution was adjusted to 5.0 with hydrochloric acid. After completely dissolving the ampholytic polymer, the pigment dispersion was gradually added to the solution to prepare the recording ink.

The composition of Yellow Ink

| | |
|---|---|
| The above-mentioned pigment dispersion | 30 pbw |
| 4-vinylpyridine/itaconic acid copolymer (Mw = 10,000) | 2 pbw |
| Glycerin | 5 pbw |
| Diethylene glycol | 12 pbw |
| Isopropyl alcohol | 3 pbw |
| Water | 48 pbw |

Magenta, cyan, and black dispersions were also prepared by a similar process by using 15 parts by weight of C. I. Pigment Red 5, 15 parts by weight of C. I. Pigment Blue 15, and 15 parts by weight of carbon black, respectively, instead of C. I. Pigment Yellow 12. After the pH of each ampholytic polymer solution was adjusted to 5.0 with hydrochloric acid, the respective pigment dispersion was added and mixed to obtain the respective recording ink.

The Composition of Magenta Ink

| | |
|---|---|
| The dispersion of C. I. Pigment Red 5 | 30 pbw |
| n-methylallylamine/itaconic acid copolymer (Mw = 7,000) | 5 pbw |
| Glycerin | 5 pbw |
| Diethylene glycol | 12 pbw |
| Isopropyl alcohol | 3 pbw |
| Water | 45 pbw |

The Composition of Cyan Ink

| | |
|---|---|
| The dispersion of C. I. Pigment Blue 15 | 30 pbw |
| 4-vinylpyridine/fumaric acid copolymer (Mw = 30,000) | 1 pbw |
| Glycerin | 5 pbw |
| Diethylene glycol | 12 pbw |
| Isopropyl alcohol | 3 pbw |
| Water | 49 pbw |

The Composition of Black Ink

| | |
|---|---|
| The dispersion of Carbon Black | 30 pbw |
| 4-vinylpyridine/itaconic acid copolymer (Mw = 10,000) | 2 pbw |
| Glycerin | 5 pbw |
| Diethylene glycol | 12 pbw |
| Isopropyl alcohol | 3 pbw |
| Water | 48 pbw |

Example 7

Inks were prepared in accordance with the following formulation:

The Composition of Yellow Ink

| | |
|---|---|
| Aqueous solution (25%) of diallyamine/-acrylic acid copolymer (Mw = 2,600) | 60% |
| Aqueous solution (25%) of Compound (1) | 0.8% |
| Diethylene glycol | 15% |
| C. I. Direct Yellow 86 | 2.2% |
| Water | 22% |

The Composition of Black Ink

| | |
|---|---|
| Aqueous solution (25%) of diallyamine/-acrylic acid copolymer (Mw = 2,600) | 60% |
| Aqueous solution (25%) of Compound (1) | 0.8% |
| Diethylene glycol | 15% |
| C. I. Direct Black 168 | 3% |
| Water | 21.2% |

In both formulations, each of the ampholytic polymer and the compound having general formula (A) was previously dissolved into a solution having a predetermined pH. By using aqueous ammonia, a 25% aqueous solution of diallyamine/acrylic acid copolymer and a 25% aqueous solution of Compound (1) were adjusted to pH=10.

Then, the above components were mixed together until the dyestuff was completely dissolved, and the mixture was subject to pressure filtration with a membrane filter having a pore size of 0.22 μm made by Sumitomo Electric Industries, Ltd., brand name: FLUOROPORE-FILTER, to obtain inks.

Example 8

Four inks having the following compositions were prepared by a method similar to EXAMPLE 7. The pH of each solution of 4-vinylpyridine/methacrylic acid copolymer, 2-vinylpyridine/maleic acid copolymer, Compound (2), and Compound (3) was adjusted to 9.5 with sodium hydroxide, and each concentration was adjusted to 25%.

The Composition of Yellow Ink

| | |
|---|---|
| Aqueous solution (25%) of 4-vinylpyridine/methacrylic acid copolymer (Mw = 8,000) | 28% |
| Aqueous solution (25%) of Compound (2) | 8% |
| Diethylene glycol | 10% |
| Glycerin | 7% |
| C. I. Direct Yellow 86 | 2% |
| Water | 45% |

The Composition of Magenta Ink

| | |
|---|---|
| Aqueous solution (25%) of 4-vinylpyridine/methacrylic acid copolymer (Mw = 8,000) | 28% |
| Aqueous solution (25%) of Compound (2) | 8% |
| Diethylene glycol | 10% |
| Glycerin | 7% |
| C. I. Acid Red 14 | 3% |
| Water | 44% |

The Composition of Cyan Ink

| | |
|---|---|
| Aqueous solution (25%) of 2-vinylpyridine/maleic acid copolymer (Mw = 100,000) | 12% |
| Aqueous solution (25%) of Compound (3) | 20% |
| Diethylene glycol | 10% |
| Glycerin | 7% |
| C. I. Direct Blue 199 | 3% |
| Water | 48% |

The Composition of Black Ink

| | |
|---|---|
| Aqueous solution (25%) of 2-vinylpyridine/maleic acid copolymer (Mw = 100,000) | 12% |
| Aqueous solution (25%) of compound (3) | 20% |
| Diethylene glycol | 10% |
| Glycerin | 7% |
| C. I. Direct Black 154 | 3% |
| Water | 48% |

Example 9

Four inks having the following compositions were prepared by a method similar to EXAMPLE 7. The pH of each solution of N-methylaminoethyl methacrylate/acrylic acid copolymer, allylamine/styrenesulfonic acid copolymer, 4-vinylpyridine/itaconic acid copolymer, 2-vinylpyridine/fumaric acid copolymer, Compound (4), Compound (5) and Compound (6) was adjusted to 9.5 with lithium hydroxide, and each concentration was adjusted to 25%.

The Composition of Yellow Ink

| | |
|---|---|
| Aqueous solution (25%) of N-methylaminoethyl methacrylate/ acrylic acid copolymer (Mw = 400,000) | 2% |
| Aqueous solution (25%) of Compound (4) | 12% |
| Diethylene glycol | 10% |
| Glycerin | 7% |
| C. I. Direct Yellow 86 | 2% |
| Water | 67% |

The Composition of Magenta Ink

| | |
|---|---|
| Aqueous solution (25%) of allylamine/styrenesulfonic acid copolymer (Mw = 40,000) | 20% |
| Aqueous solution (25%) of Compound (5) | 3.2% |
| Diethylene glycol | 10% |
| Glycerin | 7% |
| C. I. Acid Red 35 | 3% |
| Water | 56.8% |

The Composition of Cyan Ink

| | |
|---|---|
| Aqueous solution (25%) of 4-vinylpyridine/itaconic acid copolymer (Mw = 5,000) | 40% |
| Aqueous solution (25%) of Compound (6) | 4% |
| Diethylene glycol | 10% |
| Glycerin | 7% |
| C. I. Direct Blue 199 | 3% |
| Water | 36% |

The Composition of Black Ink

| | |
|---|---|
| Aqueous solution (25%) of 2-vinylpyridine/fumaric acid copolymer (Mw = 200,000) | 3.6% |
| Aqueous solution (25%) of compound (7) | 8% |
| Diethylene glycol | 10% |
| Glycerin | 7% |
| C. I. Direct Black 154 | 3% |
| Water | 68.4% |

Example 10

Three inks having the following compositions were prepared by a method similar to EXAMPLE 7. The pH of each solution of diallyamine/acrylic acid copolymer and Compound (8) was adjusted to 4.5 with lithium hydroxide, and each concentration was adjusted to 25%.

The Composition of Yellow Ink

| | |
|---|---|
| Aqueous solution (25%) of diallylamine/acrylic acid copolymer (Mw = 20,000) | 12% |
| Aqueous solution (25%) of Compound (8) | 4% |
| Diethylene glycol | 20% |
| C. I. Basic Yellow 29 | 2% |
| Water | 62% |

The Composition of Magenta Ink

| | |
|---|---|
| Aqueous solution (25%) of diallylamine/acrylic acid copolymer (Mw = 20,000) | 12% |
| Aqueous solution (25%) of Compound (8) | 4% |
| Diethylene glycol | 20% |
| C. I. Basic Red 1 | 3% |
| Water | 61% |

The Composition of Cyan Ink

| | |
|---|---|
| Aqueous solution (25%) of diallyamine/acrylic acid copolymer (Mw = 20,000) | 12% |
| Aqueous solution (25%) of Compound (8) | 4% |
| Diethylene glycol | 20% |
| C. I. Basic Blue 100 | 3% |
| Water | 61% |

Example 11

Preparation of Yellow Pigment Dispersion

| | |
|---|---|
| Styreneacrylic acid/butyl acrylate copolymer (Acid value = 116, Mw = 3,700) | 2 pbw |
| Monoethanolamine | 2 pbw |
| Water | 76 pbw |
| Diethylene glycol | 5 pbw |

These components were mixed and heated to 70° C. in a water bath to completely dissolve the resinous component. Into the solution, 15 parts by weight of C. I. Pigment Yellow 12 was added. After premixing for 30 minutes, the mixture was treated for dispersion with the following conditions:

Dispersion mixer: Sand grinder made by Igarashi Kikai K. K.

Grinding media: Zirconia Beads (1 mm in diameter)

Filling ratio of grinding media: 50% by volume

Grinding time: 3 hours

Then, coarse particles were eliminated to obtain the dispersion by centrifugation at 12,000 rpm for 20 minutes.

Before preparing a yellow ink from the dispersion, each of the ampholytic polymer, i.e., methylallylamine/itaconic acid copolymer, and Compound (1) was prepared as a 25% aqueous solution having a pH of 9.5 with aqueous ammonia. After each component of the following composition other than the dispersion was mixed in a solution, the pigment dispersion was gradually added into the solution while mixing thoroughly to obtain the yellow ink.

The Composition of Yellow Ink

| | |
|---|---|
| The above dispersion | 30% |
| Aqueous solution (25%) of methylallylamine/itaconic acid copolymer (Mw = 5,000) | 8% |
| Aqueous solution (25%) of Compound (1) | 2% |
| Glycerin | 7% |
| Thiodiglycol | 10% |
| Water | 43% |

Instead of C. I. Pigment Yellow 12, 15 parts by weight of C. I. Pigment Red 5 for a magenta ink, 15 parts by weight of C. I. Pigment Blue 15 for a cyan ink, and 15 parts by weight of carbon black for a black ink were added to prepare the respective dispersions. The magenta, cyan, and black inks were similarly prepared according to the following formulations:

The Composition of Magenta Ink

| | |
|---|---|
| The above dispersion of C. I. Pigment Red 5 | 30% |
| Aqueous solution (25%) of methylallylamine/itaconic acid copolymer (Mw = 5,000) | 8% |
| Aqueous solution (25%) of Compound (1) | 2% |
| Glycerin | 7% |
| Thiodiglycol | 10% |
| Water | 43% |

The Composition of Cyan Ink

| | |
|---|---|
| The above dispersion of C. I. Pigment Blue 15 | 30% |
| Aqueous solution (25%) of methylallylamine/itaconic acid copolymer (Mw = 5,000) | 8% |
| Aqueous solution (25%) of Compound (1) | 2% |
| Glycerin | 7% |
| Thiodiglycol | 10% |
| Water | 43% |

The Composition of Black Ink

| | |
|---|---|
| The above dispersion of carbon black | 30% |
| Aqueous solution (25%) of methylallylamine/itaconic acid copolymer (Mw = 5,000) | 8% |
| Aqueous solution (25%) of Compound (1) | 2% |
| Glycerin | 7% |
| Thiodiglycol | 10% |
| Water | 43% |

Example 12

Preparation of Yellow Pigment Dispersion

| | |
|---|---|
| Poly-N,N'-dimethyl-3,5-methylenepiperidinium salt (Mw = 3,700) | 2 pbw |
| Water | 78 pbw |
| Diethylene glycol | 5 pbw |

These components were mixed and heated to 70° C. in a water bath to completely dissolve the resinous component. Into the solution, 15 parts by weight of C. I. Pigment Yellow 12 was added. After premixing for 30 minutes, the mixture was treated for dispersion with the following conditions:

Dispersion mixer: Sand grinder made by Igarashi Kikai K. K.

Grinding media: Zirconia Beads (1 mm in diameter)

Filling ratio of grinding media: 50% by volume

Grinding time: 3 hours

Then, coarse particles were eliminated to obtain the dispersion by centrifugation at 12,000 rpm for 20 minutes.

Before preparing a yellow ink from the dispersion, each of the ampholytic polymer, i.e., 4-vinylpyridine/fumaric acid copolymer, and Compound (2) was prepared as a 25% aqueous solution having a pH of 4.5 with hydrochloric acid. After each component of the following composition other than the dispersion was mixed in a solution, the pigment dispersion was gradually added into the solution while mixing thoroughly to obtain the yellow ink.

The Composition of Yellow Ink

| | |
|---|---|
| The above dispersion | 30% |
| Aqueous solution (25%) of 4-vinylpyridine/fumaric acid copolymer (Mw = 3,000) | 12% |
| Aqueous solution (25%) of Compound (2) | 1% |
| Glycerin | 7% |
| Diethylene glycol | 10% |
| Water | 40% |

Instead of C. I. Pigment Yellow 12, 15 parts by weight of C. I. Pigment Red 5 for a magenta ink, 15 parts by weight of C. I. Pigment Blue 15 for a cyan ink, and 15 parts by weight of carbon black for a black ink were added to prepare the respective dispersions. The magenta, cyan, and black inks were similarly prepared according to the following formulations:

The Composition of Magenta Ink

| | |
|---|---|
| The above dispersion of C. I. Pigment Red 5 | 30% |
| Aqueous solution (25%) of 4-vinylpyridine/fumaric acid copolymer (Mw = 3,000) | 12% |
| Aqueous solution (25%) of Compound (2) | 1% |

-continued

|  |  |
|---|---|
| Glycerin | 7% |
| Diethylene glycol | 10% |
| Water | 40% |

The Composition of Cyan Ink

|  |  |
|---|---|
| The above dispersion of C. I. Pigment Blue 15 | 30% |
| Aqueous solution (25%) of 4-vinylpyridine/fumaric acid copolymer (Mw = 3,000) | 12% |
| Aqueous solution (25%) of Compound (2) | 1% |
| Glycerin | 7% |
| Diethylene glycol | 10% |
| Water | 40% |

The Composition of Black Ink

|  |  |
|---|---|
| The above dispersion of carbon black | 30% |
| Aqueous solution (25%) of 4-vinylpyridine/fumaric acid copolymer (Mw = 3,000) | 12% |
| Aqueous solution (25%) of Compound (2) | 1% |
| Glycerin | 7% |
| Diethylene glycol | 10% |
| Water | 40% |

Recording was performed on commercial copy paper and bond paper using the obtained inks. In EXAMPLES 1 and 7, the yellow and black inks were recorded at the same time. In EXAMPLES 2, 3, 5, 6, 8, 9, 11, and 12, the four color inks, i.e., yellow, magenta, cyan, and black inks, were recorded at the same time. In EXAMPLES 4 and 10, the yellow, magenta, cyan inks were recorded at the same time, and a black color was generated by combining these three colors.

A recording apparatus similar to that shown in FIG. 4 with four recording heads as shown in FIG. 7 was used to form color images. The recording head used was the one used in BJC820, trade name of an ink-jet printer made by Canon. The heads were driven with an applied voltage of 28V, a pulse width of $3.2\mu$ seconds, and a drive frequency of 5 kHz.

Comparative Example 1

Recording was carried out in a manner similar to EXAMPLE 1 using a ink which did not contain 4-vinylpyridine/acrylic acid copolymer.

Comparative Example 2

Recording was carried out in a manner similar to EXAMPLE 2 using inks which did not contain allylamine/ styrenesulfonic acid copolymer, 4-vinylpyridine/acrylic acid copolymer, or 2-vinylpyridine/maleic acid copolymer.

Comparative Example 3

Recording was carried out in a manner similar to EXAMPLE 3 using inks which did not contain diallylamine/ styrenesulfonic acid copolymer, 4-vinylpyridine/maleic acid copolymer, 2-vinylpyridine/itaconic acid copolymer, or n-methylaminoethyl methacrylate/acrylic acid copolymer.

Comparative Example 4

Recording was carried out in a manner similar to EXAMPLE 4 using inks which did not contain allylamine/ styrenesulfonic acid copolymer, 4-vinylpyridine/acrylic acid copolymer, or 2-vinylpyridine/maleic acid copolymer.

Comparative Example 5

Recording was carried out in a manner similar to EXAMPLE 5 using inks which did not contain 4-vinylpyridine/itaconic acid copolymer, n-methylallylamine/itaconic acid copolymer, 4-vinylpyridine/fumaric acid copolymer, or 2-vinylpyridine/ itaconic acid copolymer.

Comparative Example 6

Recording was carried out in a manner similar to EXAMPLE 6 using inks which did not contain 4-vinylpyridine/itaconic acid copolymer, n-methylallylamine/itaconic acid copolymer, 4-vinylpyridine/fumaric acid copolymer, or 2-vinylpyridine/ itaconic acid copolymer.

The recorded images of EXAMPLES 1 to 12 and COMPARATIVE EXAMPLES 1 to 6 were evaluated regarding image density, bleeding, and water resistance as follows:

Image Density

Alphabetical and numeric letters and solid images were recorded on commercial copy paper and bond paper. The image densities were evaluated with a Macbeth RD915 optical densitometer made by Macbeth Corp. one hour after image recording. The results were expressed based on the following standard:

Good: an optical density of 1.1 or more
Fair: an optical density of 1.1 to 1.0
No good: an optical density of less than 1.0
Bleeding Solid images next to each other were recorded using the yellow ink, magenta ink, cyan ink, and black ink on commercial copy paper. The extent of bleeding at the boundaries of different colors was evaluated visually as follows:

Good: no bleeding and no uneven color mixing
Fair: a little bleeding and uneven color mixing, but a level acceptable in practice
No good: a level of bleeding and uneven color mixing unacceptable in practice
Water Resistance Solid images of yellow, magenta, cyan, and black were recorded on commercial copy paper. The image densities were evaluated with a Macbeth RD915 optical densitometer made by Macbeth Corp. one hour after image recording. Then the printed media were immersed into water for five minutes, allowed to dry, and the image densities were evaluated again. The water resistance was evaluated by the remaining rate expressed by the following equation:

$$\text{The remaining rate of image density} = \frac{\text{Image density after water resistance test}}{\text{Image density before water resistance test}} \times 100$$

The results were expressed based on the following standard:

Good: A remaining rate of 75% or more
Fair: A remaining rate of from 60% to 75%
No good: A remaining rate of less than 60%

Results are summarized in Table 1.

TABLE 1

| EXAMPLE | IMAGE DENSITY | BLEEDING | WATER RESISTANCE |
|---|---|---|---|
| EXAMPLE 1 | Good | Good | Good |
| EXAMPLE 2 | Good | Good | Good |
| EXAMPLE 3 | Good | Good | Good |
| EXAMPLE 4 | Good | Good | Good |
| EXAMPLE 5 | Good | Good | Good |
| EXAMPLE 6 | Good | Good | Good |
| EXAMPLE 7 | Good | Good | Good |
| EXAMPLE 8 | Good | Good | Good |
| EXAMPLE 9 | Good | Good | Good |
| EXAMPLE 10 | Good | Good | Good |
| EXAMPLE 11 | Good | Good | Good |
| EXAMPLE 12 | Good | Good | Good |
| COMPARATIVE EXAMPLE 1 | Good | No Good | No Good |
| COMPARATIVE EXAMPLE 2 | Good | No Good | Fair |
| COMPARATIVE EXAMPLE 3 | No Good | Fair | No Good |
| COMPARATIVE EXAMPLE 4 | Good | No Good | No Good |
| COMPARATIVE EXAMPLE 5 | Good | No Good | Good |
| COMPARATIVE EXAMPLE 6 | Good | No Good | Good |

As described above, the present invention provides an image having excellent image density without bleeding, and excellent water resistance when color ink-jet recording is performed on plain paper. Further, according to the ink-jet recording process and apparatus of the present invention, an image having excellent image density without bleeding, and excellent water resistance can be recorded on plain paper when the above-mentioned ink is used.

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

What is claimed is:

1. An ink comprising:

an anionic dye, a solvent for dissolving the anionic dye, an ampholytic polymer having an isoelectric point in a pH range of 3 to 10, the polymer being a copolymer of a monomer having an anionic group and a monomer having a cationic group, and a compound represented by the following general formula (A):

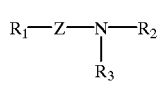

(A)

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from a group consisting of a carboxyl group, salts of the carboxyl group, a sulfonic group, salts of the sulfonic group, and a hydrogen atom; and when each of $R_2$ and $R_3$ is a hydrogen atom, c and e are not both zero, and $X_1$, $X_2$, $X_3$, and $X_4$ are not all hydrogen atoms, wherein the ink has a higher pH than the isoelectric point of the polymer, and wherein the pH of the ink is set such that application of the ink onto a plain paper causes (1) the pH of the ink to be equal to the isoelectric point of the ampholytic polymer and (2) the anionic dye to react with the ampholytic polymer.

2. An ink comprising:

a cationic dye, a solvent for dissolving the cationic dye, an ampholytic polymer having an isoelectric point in a pH range of 3 to 10, the polymer being a copolymer of a monomer having an anionic group and a monomer having a cationic group, and a compound represented by the following general formula (A):

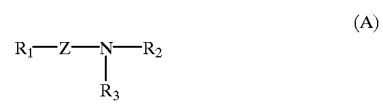

(A)

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from a group consisting of a carboxyl group, salts of the carboxyl group, a sulfonic group, salts of the sulfonic group, and a hydrogen atom; and when each of $R_2$ and $R_3$ is a hydrogen atom, c and e are not both zero, and $X_1$, $X_2$, $X_3$, and $X_4$ are not all hydrogen atoms, wherein the ink has a lower pH than the isoelectric point of the polymer, and wherein the pH of the ink is set such that application of the ink onto a plain paper causes (1) the pH of the ink to be equal to the isoelectric point of the ampholytic polymer and (2) the cationic dye to react with the ampholytic polymer.

3. An ink comprising:

a pigment, a solvent, an ampholytic polymer having an isoelectric point in a pH range of 3 to 10, the polymer being a copolymer of a monomer having an anionic group and a monomer having a cationic group, an anionic dispersant for dispersing the pigment anionically and forming a pigment dispersion in the solvent, and a compound represented by the following general formula (A):

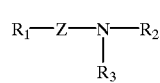

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from a group consisting of a carboxyl group, salts of the carboxyl group, a sulfonic group, salts of the sulfonic group, and a hydrogen atom; and when each of $R_2$ and $R_3$ is a hydrogen atom, c and e are not both zero, and $X_1$, $X_2$, $X_3$, and $X_4$ are not all hydrogen atoms, wherein the ink has a higher pH than the isoelectric point of the polymer, and wherein the pH of the ink is set such that application of the ink onto a plain paper causes (1) the pH of the ink to be equal to the isoelectric point of the ampholytic polymer and (2) the pigment dispersion to react with the ampholytic polymer.

4. An ink comprising:
a pigment,
a solvent,
an ampholytic polymer having an isoelectric point in a pH range of 3 to 10, the polymer being a copolymer of a monomer having an anionic group and a monomer having a cationic group,
a cationic dispersant for dispersing the pigment cationically and forming a pigment dispersion in the solvent, and
a compound represented by the following general formula (A):

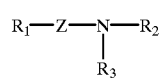

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from a group consisting of a carboxyl group, salts of the carboxyl group, a sulfonic group, salts of the sulfonic group, and a hydrogen atom; and when each of $R_2$ and $R_3$ is a hydrogen atom, c and e are not both zero, and $X_1$, $X_2$, $X_3$, and $X_4$ are not all hydrogen atoms, wherein the ink has a lower pH than the isoelectric point of the polymer, and wherein the pH of the ink is set such that application of the ink onto a plain paper causes (1) the pH of the ink to be equal to the isoelectric point of the ampholytic polymer and (2) the pigment dispersion to react with the ampholytic polymer.

5. An ink for forming an image on plain paper, comprising:
an anionic dye,
a solvent for dissolving the anionic dye,
an ampholytic polymer having an isoelectric point at about pH 7, the polymer being a copolymer of a monomer having an anionic group and a monomer having a cationic group, and
a compound represented by the following general formula (A):

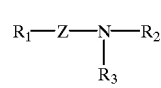

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from a group consisting of a carboxyl group, salts of the carboxyl group, a sulfonic group, salts of the sulfonic group, and a hydrogen atom; and when each of $R_2$ and $R_3$ is a hydrogen atom, c and e are not both zero, and $X_1$, $X_2$, $X_3$, and $X_4$ are not all hydrogen atoms wherein the ink has a pH higher than the isoelectric point of the polymer, but not more than 9.5, and wherein the pH of the ink is set such that application of the ink onto a plain paper causes (1) the pH of the ink to be equal to the isoelectric point of the ampholytic polymer and (2) the anionic dye to react with the ampholytic polymer.

6. An ink for forming an image on plain paper, comprising:
a cationic dye,
a solvent for dissolving the cationic dye,
an ampholytic polymer having an isoelectric point at about pH 7, the polymer being a copolymer of a monomer having an anionic group and a monomer having a cationic group, and
a compound represented by the following general formula (A):

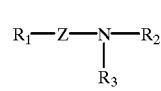

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from a group consisting of a carboxyl group, salts of the carboxyl group, a sulfonic group, salts of the sulfonic group, and a hydrogen atom; and when each of $R_2$ and $R_3$ is a hydrogen atom, c and e are not both zero, and $X_1$, $X_2$, $X_3$, and $X_4$ are not all hydrogen atoms, wherein the ink has a pH lower than the isoelectric point of the polymer, but not less than 4.5, and wherein the pH of the ink is set such that application of the ink onto a plain paper causes (1) the pH of the ink to be equal to the isoelectric point of the ampholytic polymer and (2) the cationic dye to react with the ampholytic polymer.

7. An ink for forming an image on plain paper, comprising:
a pigment,
a solvent,
an ampholytic polymer having an isoelectric point at about pH 7, the polymer being a copolymer of a monomer having an anionic group and a monomer having a cationic group,
an anionic dispersant for dispersing the pigment and forming a pigment dispersion in the solvent anionically, and
a compound represented by the following general formula (A):

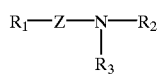

(A)

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from a group consisting of a carboxyl group, salts of the carboxyl group, a sulfonic group, salts of the sulfonic group, and a hydrogen atom; and when each of $R_2$ and $R_3$ is a hydrogen atom, c and e are not both zero, and $X_1$, $X_2$, $X_3$, and $X_4$ are not all hydrogen atoms, wherein the ink has a pH higher than the isoelectric point of the polymer, but not more than 9.5, and wherein the pH of the ink is set such that application of the ink onto a plain paper causes (1) the pH of the ink to be equal to the isoelectric point of the ampholytic polymer and (2) the pigment dispersion to react with the ampholytic polymer.

8. An ink for forming an image on plain paper, comprising:
a pigment,
a solvent,
an ampholytic polymer having an isoelectric point at about pH 7, the polymer being a copolymer of a monomer having an anionic group and a monomer having a cationic group,
a cationic dispersant for dispersing the pigment and forming a pigment dispersion in the solvent cationically, and
a compound represented by the following general formula (A):

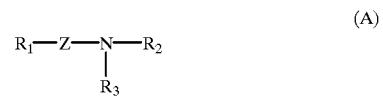

(A)

wherein $R_1$ represents a hydrogen atom or an alkyl group having 1 to 48 carbon atoms; $R_2$ represents a hydrogen atom or $(CH_2)_a$—$X_1$ where a is an integer of 1 to 4; $R_3$ represents a hydrogen atom, $(CH_2)_b$—$X_2$, or $R_4$—Y where b is an integer of 1 to 4; $R_4$ represents a hydrogen atom or an alkyl group having 1 to 48 carbon atoms; Z represents $(NR_5C_lH_{2l})_c(NHC_nH_{2n})_d$, where each of l and n is an integer of 2 to 4, c+d is an integer of 0 to 50; Y represents $(NR_6C_mH_{2m})_e(NHC_pH_{2p})_f$, where each of m and p is an integer of 2 to 4, e+f is an integer of 0 to 50; $R_5$ represents $(CH_2)_g$—$X_3$, where g is an integer of 1 to 4; $R_6$ represents $(CH_2)_h$—$X_4$, where h is an integer of 1 to 4; each of $X_1$, $X_2$, $X_3$, and $X_4$ is selected from a group consisting of a carboxyl group, salts of the carboxyl group, a sulfonic group, salts of the sulfonic group, and a hydrogen atom; and when each of $R_2$ and $R_3$ is a hydrogen atom, c and e are not both zero, and $X_1$, $X_2$, $X_3$, and $X_4$ are not all hydrogen atoms, wherein the ink has a pH lower than the isoelectric point of the polymer, but not less than 4.5, and wherein the pH of the ink is set such that application of the ink onto a plain paper causes (1) the pH of the ink to be equal to the isoelectric point of the ampholytic polymer and (2) the pigment dispersion to react with the ampholytic polymer.

9. An ink according to any one of claims 1 or 2–8, wherein 0.1 to 30 weight percent of said ink is said ampholytic polymer.

10. An ink according to any one of claims 1 or 2–8, wherein said ampholytic polymer is selected from the group consisting of allylamine/maleic acid copolymer, n-methylallylamine/maleic acid copolymer, 4-vinylpyridine/acrylic acid copolymer, n-methylaminoethyl methacrylate/methacrylic acid copolymer, acrylamide/styrenesulfonic acid copolymer, allylamine/styrenesulfonic acid copolymer, 2-vinylpyridine/maleic acid copolymer, diallylamine/styrenesulfonic acid copolymer, 4-vinylpyridine/maleic acid copolymer, 2-vinylpyridine/itaconic acid copolymer, n-methylaminoethyl methacrylate/acrylic acid copolymer, 4-vinylpyridine/itaconic acid copolymer, n-methylallylamine/itaconic acid copolymer, and 4-vinylpyridine/fumaric acid copolymer.

11. An ink according to any one of claims 1 or 2–8, wherein said solvent comprises water and a water-soluble organic solvent.

12. An ink according to any one of claims 1 or 2–8, wherein said ink further comprises a pH modifier.

13. An ink according to any one of claims 1 or 2–8, wherein the anionic group of the ampholytic polymer is at least one group selected from carboxyl group and sulfonic group.

14. An ink according to any one of claims 1 or 2–8, wherein the cationic group of the ampholytic polymer is at least one group selected from the group consisting of amino group, imino group, pyrrolidone ring, and imidazole ring.

15. An ink according to any one of claims 1 or 2–8, wherein the ampholytic polymer has a weight-average molecular weight in a range from 1,000 to 1,000,000.

16. An ink according to any one of claims 1 or 2–8, wherein each of $X_1$, $X_2$, $X_3$, and $X_4$ is selected from the group consisting of salts of the carboxyl group, salts of the sulfonic group, and a hydrogen atom.

17. An ink according to any one of claims 1 or 2–8, wherein each of $R_1$ and $R_4$ of the compound of the general formula (A) is an alkyl group having 1 to 32 carbon atoms, each of c+d and e+f is an integer of 0 to 16, and each of a, b, g, and h is an integer of 1 to 2.

18. An ink according to any one of claims 1 or 2–8, wherein the amounts of the ampholytic polymer and the compound of the general formula (A) range from 0.1 to 30 weight percent, and 0.01 to 10 weight percent, respectively, of the total ink weight.

\* \* \* \* \*

UNITED STATES PATENT AND TRADEMARK OFFICE
CERTIFICATE OF CORRECTION

PATENT NO. : 6,174,354 B1
DATED : January 16, 2001
INVENTOR(S) : Yoshihisa Takizawa et al.

Page 1 of 1

It is certified that error appears in the above-identified patent and that said Letters Patent is hereby corrected as shown below:

Title page,
Item [56] References Cited/FOREIGN PATENT DOCUMENTS:
"3145381" should read -- 63-3145381 --.
"3145382" should read -- 63-3145382 --.

Column 6,
Line 35, "$C_3(H_7(NHC_2H_4)_2NHCH_2COONa$" should read -- $C_3H_7(NHC_2H_4)_2NHCH_2COONa$ --.

Column 7,
Line 64, "succinimido." should read -- succinimide. --.

Column 8,
Line 1, "alkaline," should read -- alkali, --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*